(12) United States Patent
Christou (10) Patent No.: US 12,364,953 B2
(45) Date of Patent: Jul. 22, 2025

(54) TUBULAR MEMBRANE INCLUDING A VORTEX GENERATOR THAT PRODUCES SPIRAL FLUID FLOW

(71) Applicant: SWIRLTEX HOLDINGS CORP., Calgary (CA)

(72) Inventor: Peter James Christou, Calgary (CA)

(73) Assignee: SWIRLTEX HOLDINGS CORP., Calgary (CA)

( * ) Notice: Subject to any disclaimer, the term of this patent is extended or adjusted under 35 U.S.C. 154(b) by 58 days.

(21) Appl. No.: 17/476,070

(22) Filed: Sep. 15, 2021

(65) Prior Publication Data

US 2022/0001332 A1    Jan. 6, 2022

Related U.S. Application Data

(62) Division of application No. 15/548,717, filed as application No. PCT/CA2016/050096 on Feb. 3, 2016, now Pat. No. 11,154,818.

(Continued)

(51) Int. Cl.
*B01D 63/06* (2006.01)
*B01D 17/02* (2006.01)
(Continued)

(52) U.S. Cl.
CPC ......... *B01D 63/06* (2013.01); *B01D 17/0205* (2013.01); *B01D 69/04* (2013.01);
(Continued)

(58) Field of Classification Search
CPC .... B01D 63/06; B01D 17/0205; B01D 63/02; B01D 69/04; B01D 2313/086;
(Continued)

(56) References Cited

U.S. PATENT DOCUMENTS 4,044,834 A * 8/1977 Perkins .................. E21B 21/08
175/218
4,279,743 A    7/1981 Miller
(Continued)

FOREIGN PATENT DOCUMENTS

CA    1178382 A    11/1984
CN    204342490 U    5/2015
(Continued)

OTHER PUBLICATIONS

Arumugam, et al "Understanding the Fundamental Mechanisms of Dynamic Micro-bubble Generator for Nater Processing and Cleaning Applications", Master of Applied Science Thesis, University of Toronto, 2015, 92 ages.

(Continued)

*Primary Examiner* — Hayden Brewster
(74) *Attorney, Agent, or Firm* — Lewellyn Law, PLLC (57) ABSTRACT

A permeable membrane tube to separate mixed fluids is provided, including a cyclone generator configured to cause fluid entering the permeable tube to flow in a spiral direction. The cyclonic generator may be a plug positioned at the fluid entrance of the membrane tube. The fluid passes through the permeable membrane tube, which has a center axis along a length of the tube, and flows in the spiral direction thereby separating the fluid into first and second (Continued)

portions, wherein the first portion comprises fluid having a greater density than the second portion and the first portion is directed to an inner surface of the tube.

11 Claims, 6 Drawing Sheets

Related U.S. Application Data (60) Provisional application No. 62/111,498, filed on Feb. 3, 2015.

(51) Int. Cl.
| | |
|---|---|
| *B01D 69/04* | (2006.01) |
| *C02F 1/24* | (2023.01) |
| *C02F 1/40* | (2023.01) |
| *C02F 1/44* | (2023.01) |
| *C02F 101/32* | (2006.01) |

(52) U.S. Cl.
CPC ............ *C02F 1/24* (2013.01); *C02F 1/40* (2013.01); *C02F 1/44* (2013.01); *B01D 2313/086* (2013.01); *B01D 2313/105* (2013.01); *C02F 2101/32* (2013.01)

(58) Field of Classification Search
CPC ........ B01D 2313/105; C02F 1/24; C02F 1/40; C02F 1/44; C02F 2101/32
See application file for complete search history.

(56) References Cited

U.S. PATENT DOCUMENTS

| | | | |
|---|---|---|---|
| 4,687,522 | A | 8/1987 | Hayashi et al. |
| 4,790,941 | A | 12/1988 | Taylor |
| 5,393,315 | A | 2/1995 | Alliston et al. |
| 5,985,151 | A | 11/1999 | Ahmadi |
| 6,632,358 | B1 | 10/2003 | Suga |
| 9,061,251 | B2 | 6/2015 | Hobbs et al. |
| 2007/0114480 | A1 | 5/2007 | Burke |
| 2014/0225286 | A1 | 8/2014 | Paxton |
| 2015/0182916 | A1 | 7/2015 | Kanai |
| 2016/0250598 | A1 | 9/2016 | Blankert et al. |
| 2017/0197183 | A1 | 7/2017 | Lee et al. |
| 2018/0056240 | A1 | 3/2018 | Xiao et al. |
| 2018/0065090 | A1 | 3/2018 | Christou |
| 2018/0369754 | A1 | 12/2018 | Matsumoto et al. |

FOREIGN PATENT DOCUMENTS

| | | | |
|---|---|---|---|
| CN | 105688678 | A | 6/2016 |
| CN | 207609901 | U | 7/2018 |
| JP | H0584429 | A | 4/1993 |
| WO | 9421362 | A1 | 9/1994 |
| WO | 9952618 | A2 | 10/1999 |
| WO | 2006054088 | A1 | 5/2006 |
| WO | 2013042084 | A2 | 3/2013 |
| WO | 2016123708 | A1 | 8/2016 |
| WO | 2021074235 | A1 | 4/2021 |

OTHER PUBLICATIONS

CN105688678 Xue—Vortex tube-type membrane component and system (Abstract & MT; EFD Nov. 25, 2014). (Year: 2014).
CN204342490U Li—Membrane tube type reverse osmosis filtering separation device [Abstract & MT; Dec. 4, 2014]. (Year: 2014).
Hilal, et al., "Methods Employed for Control of Fouling in MF and UF Membranes: A Comprehensive Review," Separation Science and Technology, 40, 1957-2005.
JPH0584429A Matsushita et al, Membrane Separator (Abstract & MT; Apr. 6, 1993; 15 pages) (Year: 1993).
Pengyu et al. "Dynamic Crossflow Filtration With a Rotating Tubular Membrane: Using Centripetal Force to Decrease Fouling by Buoyant Particles", Chemical Engineering Research and Design Journal, Jun. 8, 2015. 46 pages.
Sarah et al., "Fouling Mitigation in Tubular Membranes by 3D-printed Twisted Tape Turbulence Promoters", Journal of Membrane Science, Oct. 2, 2017, 22 pages.
Sarah, et al., "Aerating Static Mixers Prevent Fouling," Journal of Membrane Science, 2019, 570-571, pp. 537-546.
Svetlana, et al., "Twisted Tapes as Turbulence Promoters in the Microfiltration of Milk", Journal of Membrane Science, 384, 2011, pp. 97-106.
United States U.S. Appl. No. 15/548,717, Restriction Requirement dated Mar. 21, 2019.
United States U.S. Appl. No. 15/548,717, Final Office Action dated Dec. 23, 2019.
United States U.S. Appl. No. 15/548,717, Non Final Office Action dated Jun. 27, 2019.
United States U.S. Appl. No. 15/548,717, Notice of Allowance dated Sep. 7, 2021.
United States U.S. Appl. No. 15/548,717, Non Final Office Action dated May 25, 2021.
Zhang, et al. "Dynamics and Effective Distance of Gas-liquid Two-phase Swirling Flow Induced by Vortex Tools," Advances in Mechanical Engineering, 2018, vol. 10(9), pp. 1-11.
Canadian Patent Application No. 2,975,761, Office Action dated Dec. 22, 2021.
Canadian Patent Application No. 2,975,761, Office Action dated Sep. 15, 2022.
United States U.S. Appl. No. 17/167,657, Non Final Office Action dated Dec. 14, 2022.
Armbruster, et al., "Fouling Mitigation in Tubular Membranes by 3d-printed Turbulence Promoters," Journal of Membrane Science, 2018, vol. 554, pp. 156-163.
Armbruster, et al., "Short and Spaced Twisted Tapes to Mitigate Fouling in Tubular Membranes," Journal of Membrane Science, 2019, vol. 595 (1), pp. 1-14.
U.S. Appl. No. 17/167,657, Non-Final Office Action dated May 24, 2023.
Canadian Patent Application No. 3072828 Office Action dated Nov. 15, 2023.
Canadian Patent Application No. 3,108,161, Office Action dated Nov. 21, 2023.
U.S. Appl. No. 17/167,657, Final Office Action dated Oct. 26, 2023.
U.S. Appl. No. 17/167,657, Restriction Requirement dated Sep. 7, 2022.

\* cited by examiner

TUBULAR MEMBRANE INCLUDING A VORTEX GENERATOR THAT PRODUCES SPIRAL FLUID FLOW

RELATED APPLICATIONS

This application is a divisional of U.S. application Ser. No. 15/548,717, filed Aug. 3, 2017, which is a National Stage Entry of International Application No. PCT/CA2016/050096, filed Feb. 3, 2016, which claims the benefit of U.S. Provisional Patent Application No. 62/111,498, filed Feb. 3, 2015, which are hereby incorporated by reference in their entirety.

FIELD OF THE INVENTION

This invention relates to membrane filtration systems, and more particularly to increasing the efficiency of the membrane and separation of a liquid stream passing through the membrane.

BACKGROUND

Membrane filtration operates on the principle that when a liquid is passed across or through a physical barrier, particles whose size is larger than the pores in the membrane are retained on one side of the barrier, while the remaining liquid passes through. This principle holds true for coarse filters, such as metal sieves, as well as much finer materials which are capable of selective filtration and concentration of molecules of different sizes. Membrane filtration often uses a polymer or similar material with an extremely small pore size and may be used to recover quantities of water or a finished product from a waste stream, or to separate water from an oil stream.

Ceramic membranes may be used for oil/water separation because they can be cleaned at extremely high temperatures and with strong chemical concentrations, as oil or waste within the membrane tends to stain and clog the membrane. This clogging is a common problem with available membranes.

SUMMARY OF THE INVENTION

Efficiency of membranes can be increased by spinning the liquid within the tube to channel less dense liquids or gases into the center of the membrane tube. Water or the densest material in the liquid stream will be biased to and be in contact with the inner surface of the membrane. Due to the centrifugal force created by the flow pattern within the membrane, the less dense material, such as oil, is channeled into the center of the membrane away from the inner surface thereof to decrease fouling and clogging of the membrane.

The membrane according to the invention is based on increasing the energy efficacy of a membrane tube by creating a vortex of the fluid passing through the membrane tube. The swirl or vortex action of the fluid creates a centrifugal force which concentrates the denser and higher velocity fluid around the inner surface of the membrane tube while the center of the membrane tube retains the less dense, lower velocity fluid. For example, when the membrane tube is used in oil water separation applications, the oil is channeled to the center of the membrane tube due to the lower velocity and lower density, and the water concentrates around the inner wall surface of the membrane tube. The density differential created by the whirling action inside the membrane tube aids in separation and also keeps the inner surface of the membrane tube clean as less oil contacts the inner surface. The membrane tube according to the invention thus also has increased efficiency in separating the oil and water in the fluid as the fluid flows through the membrane tube.

Given the high flux and power efficiency provided by the membrane tubes according to the invention, fewer membranes are needed and they can be used with a smaller pump. For example, in oil/water separation applications, the membrane tubes according to the invention reduce the effects of oil on the membrane by keeping the oil off the inner surface of the membrane, which extends the membranes tube's effective life.

Other applications for the system according to the invention include waste water treatment, bilge water, pharmaceutical and frack water treatment and desalination. The system according to the invention provides a more efficient separation process and higher filtration efficiencies for such applications. The system according to the invention increases the efficiency of the membrane and separates and filters liquids based on their buoyancy.

This specification describes a tubular membrane, alternatively called a tubular membrane module, having at least one membrane tube having a permeable inner surface and wall. The tubular membrane also has a vortex generator configure to cause fluid within the membrane tube to flow in a spiral around a longitudinal axis of the membrane tube.

DESCRIPTION OF THE INVENTION

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

As shown in FIGS. 1A through 1D and 2A through 2C, tubular membrane 10 includes cylindrical shell 20, typically made of stainless steel or titanium (in non-oil separation application a PVC pipe is common) or other waterproof materials, containing a plurality of aligned membrane tubes 30. Each membrane tube 30 is a porous tube having a permeable membrane. A spacer 35 may be positioned at the end of each membrane tube, and a fluid exit is positioned to channel the permeated fluid out of the tubular membrane 10. Tubular membrane 10 and membrane tubes 30 are described here as examples of the environment of membrane tubes with which the system according to the invention may be used.

In operation, when a liquid stream is pumped through membrane 10, a spiral flow pattern is generated, as described below, within the individual membrane tube 30 separates the liquids of the liquid stream based upon their density. The denser liquid in the liquid stream is filtered through the membrane, while the rest of the liquid stream passes through membrane tube 30.

Figure 3A:
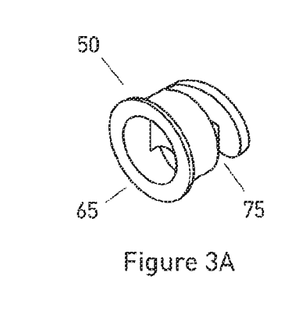
FIG. 3A is a perspective view of an embodiment of a plug for a membrane tube according to the invention.
Figure 3B:
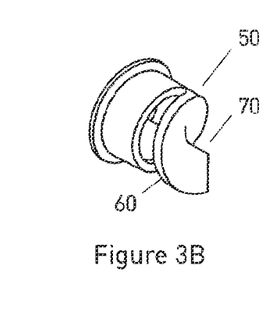
FIG. 3B is an alternate perspective view thereof.
Figure 3C:
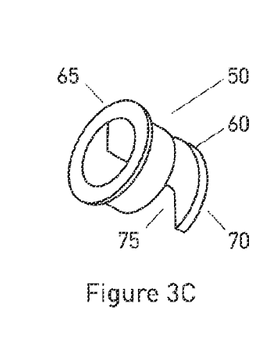
FIG. 3C is another alternate perspective view thereof.
Figure 3D:
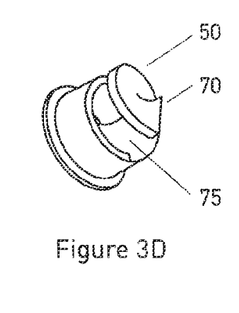
FIG. 3D is another alternate perspective view thereof.
Figure 3E:
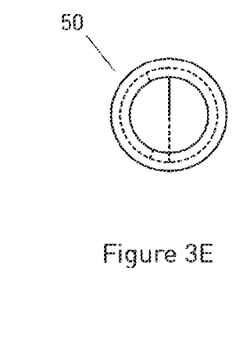
FIG. 3E is a front view thereof.
Figure 3F:
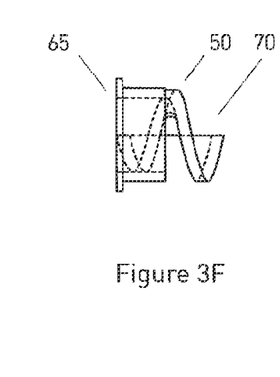
FIG. 3F is a side view thereof.
Figure 3G:
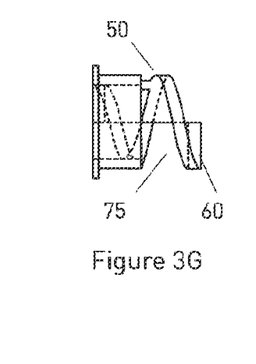
FIG. 3G is an opposing side view thereof.
Figure 3H:
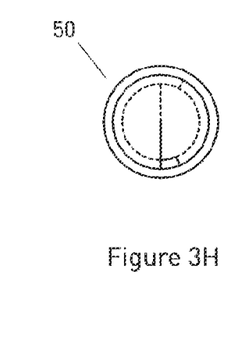
FIG. 3H is a back view thereof.

In the tubular membrane 10 according to the invention, the fluid is spun to create a vortex as it passes through a membrane tube 30. The means for spinning the fluid may be a vortex generator, such as plug 50 as shown in FIG. 3, which may be positioned in spacer 35 or where spacer 35 and membrane tube 30 meet. Plug 50 may be used in any tubular membrane so long as at least one membrane tube 30 is present. The vortex generator is used to create the desired angle and pitch of the spiral flow within the membrane 10.

Vortex generators may vary depending upon the desired spiral within the membrane. A traditional centrifugal side entry vortex generator can be used at the exit of membrane tube 30 to create the high velocities of fluid flow across the inner surface 450 of membrane tube 30, and a vortex generator near the fluid inlet of the membrane tube 30 can be cone shaped or sloped to direct the flow and create backpressure on membrane tube 30. A vortex generator can be placed in the inlet and/or in the outlet of the individual membrane tube 30 to achieve the desired backpressure and spiral flow through the membrane tube 30.

A vortex generator such as plug 50 may be used, which directs the flow of fluid entering through input side 65 through to exit side 70. As the fluid moves along curving member 60, the fluid is channeled in a spiral motion causing the flow of the fluid though membrane tube 30 to be cyclonic. Plug 50 may be sized to adjust the speed of the spiral based on factors such as the mixture of fluids, for example the amount of oil in the fluid entering plug 50. Curving member 60 can be angled as appropriate to generate the vortex within the membrane. The desired vortex will depend on the density and characteristics of the fluid.

Figure 8:
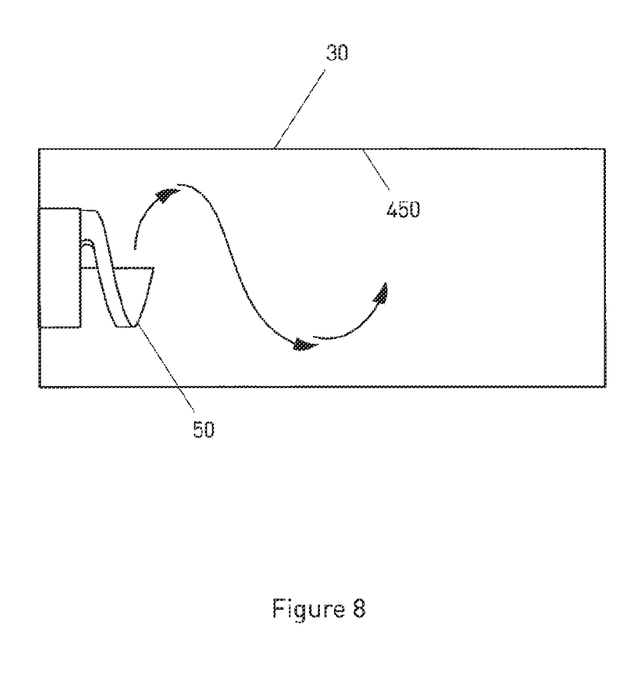
FIG. 8 is a side view of a membrane tube according to the invention, showing the fluid flow on entry into the membrane tube.

Fluid passing through plug 50 meets curving member 60, and flows into membrane tube along curving member 60, causing the fluid to leave curving member 60 in a spiral as the fluid flow through membrane tube 30, as shown in FIG. 8. Curving member 60 defines curved channel 75 through which the fluid will pass to enter membrane tube 30. Membrane tubes 30 (or spacers 35) are shaped to receive plugs 50 at least at one end (inlet or outlet), and alternatively at both ends of the membrane tube 30. The spiral speed of the vortex in membrane tube 30 will depend on how the vortex generators are applied to the membrane tube 30 and the dimensions of the vortex generator. For example, some wastewater applications may require a different velocity than oil water separation applications depending on the density of the liquids in the fluid stream.

The membrane according to the invention system is based on increasing the energy efficacy of tubular membranes by creating the vortex within the membrane tube 30. The swirl or vortex action causes the denser fluid to move at a higher velocity due to centrifugal force around the permeable inner surface 450 of the membrane tube 30 while the less dense fluid moves to the center of the membrane at a lower velocity. For example, when the tubular membrane 10 is used in oil water separation applications, the lower density oil is channeled to the center of the membrane where it has a lower velocity and the higher density water is concentrated around the inner surface of membrane tube 30. Thus by creating a vortex in the membrane tube 30, the oil is concentrated in the center of the membrane tube 30 due to the water density differential created by the spiral action inside the membrane tube 30 which keeps the inner surface 450 of the membrane tube 30 clean. The tubular membrane 10 according to the invention also has increased efficiency in separating the oil and water in the flow through the membrane 10. The fluid stream can also be manipulated using air/gases or chemicals to change to buoyancy of a fluid, to filter the desired fluid through the membrane.

Given the high flux and power efficiency provided by the tubular membrane 10 according to the invention, fewer membrane tubes 30 are needed and they can be used with a smaller pump. For oil water separation applications, the membranes 10 according to the invention reduce the effects of oil on the membrane 10 by keeping the oil off the inner surface 450 of the membrane tubes 30, which extends membrane 10's life.

Figure 4:
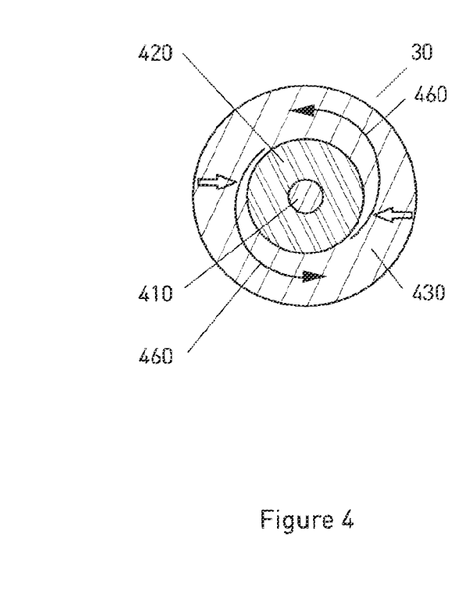
FIG. 4 is a cross sectional view of an embodiment of a membrane tube according to the invention showing the fluid movement therein.
Figure 5:
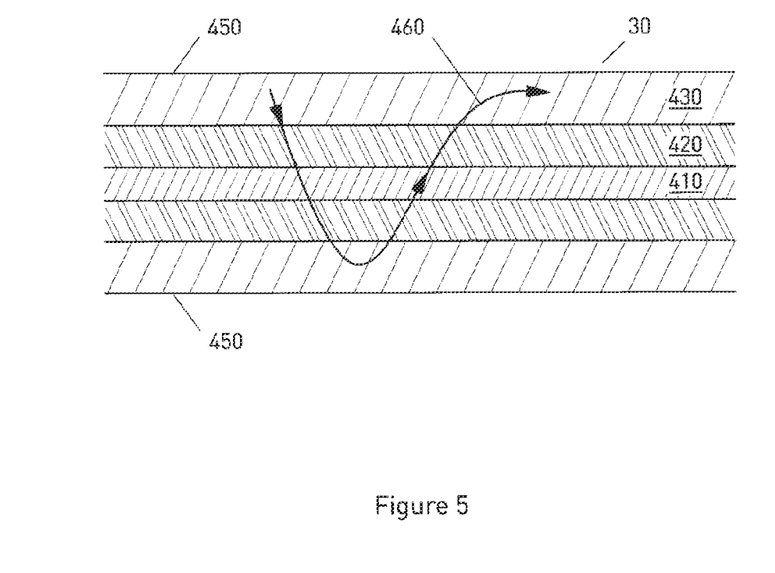
FIG. 5 is a cross sectional side view of an embodiment of a membrane tube according to the invention, showing the fluid movement therein.

The ability to separate and filter various liquids based upon their density can be used in many different ways. For example, in another embodiment of the invention air can be added to a liquid passing through the membrane tube 30, as shown in FIGS. 4 and 5. An air layer 410 fills the inner part of membrane tube 30 while the liquids are biased to the inner surface 450 of membrane tube 30 and to the fluid exit end of membrane tube 30. By filling the membrane tube with air the main membrane 10 pump would require less pumping volume. As shown in FIGS. 4 and 5, if the fluid is an oil water mixture, an oil layer 420 will be on the inside of water layer 430. The water layer 430 will be in contact with inner surface 450 of membrane tube 30. The direction of rotation is shown by arrows 460. The spiral flow pattern within membrane tube 30 creates a centrifugal force that causes the less dense portion of the fluid flow to move towards the center of membrane tube 30.

The fluid stream can be further manipulated with buoyant polymers, chemicals or gases to provide greater crossflow efficiencies within membrane tube 30. For example for water with high solids, by using a venturi valve the solids may be saturated with air within the liquid stream. When the liquid stream passes into the membrane tube 30 the solids that are saturated in air within the liquid stream are more buoyant (i.e. less dense) than the water and are forced into the center of the membrane tube 30. The water without solids circulates around the membrane surface 450 creating greater filtration efficiencies.

In another example, by adding a buoyant polymer to a water solid fluid mix, the solids are kept off the inner surface 450 of the membrane tube 30 because they will have more buoyancy and will "float" into the center of the membrane tube 30 while the water is biased towards inner surface 450.

Figure 6:
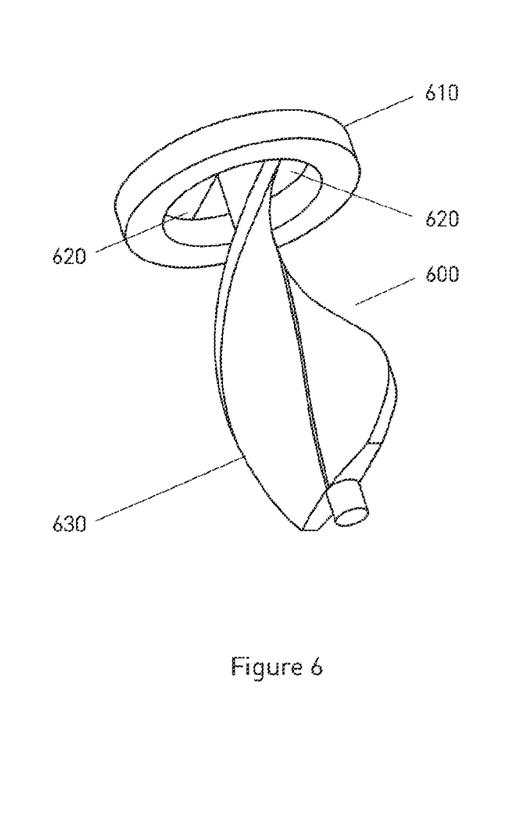
FIG. 6 is a perspective view of an alternative embodiment of a plug according to the invention.
Figure 7:
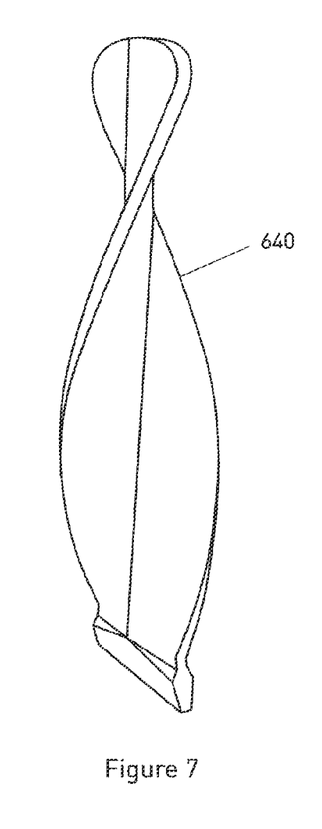
FIG. 7 is a side view of an alternative embodiment of a plug according to the invention.

FIG. 5 displays another embodiment of a vortex generator 600 according to the invention. Base 610 provides two channels 620 through which fluid may pass. Twisted blade 630 directs fluid passing through both channels in a spiral manner. FIG. 6 shows an alternative embodiment of a twisted blade 640 that could be used with base 610.

Figure 1A:
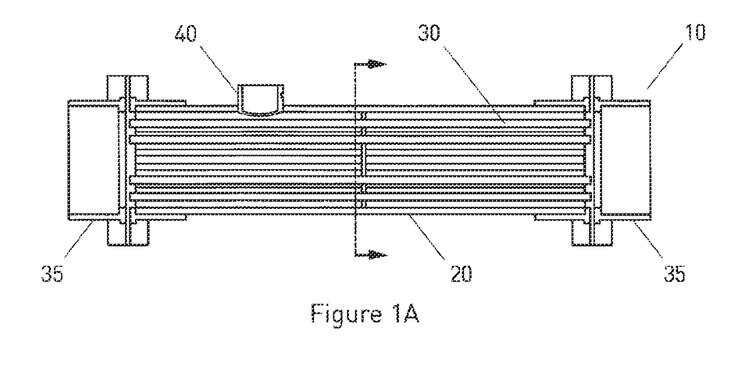
FIG. 1A is a side view of an embodiment of a tubular membrane according to the invention.
Figure 1B:
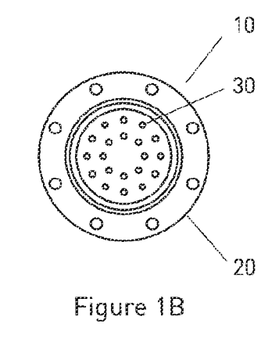
FIG. 1B is a cross sectional view thereof taken along line A-A.
Figure 1C:
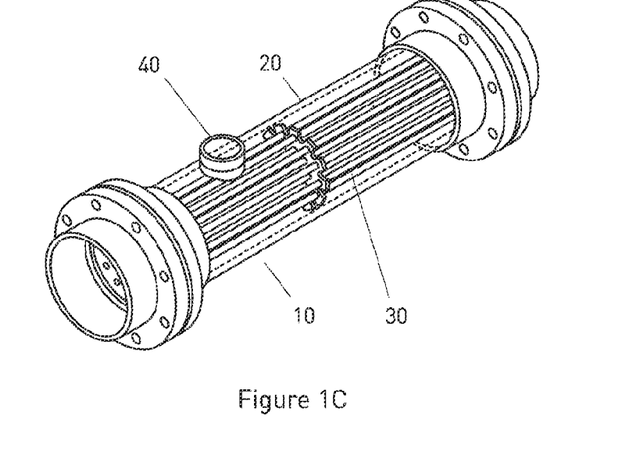
FIG. 1C is a perspective view thereof.
Figure 1D:
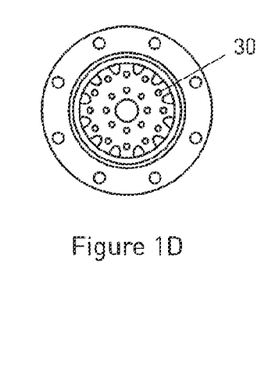
FIG. 1D is a cross sectional view of a spacer used therein.
Figure 2A:
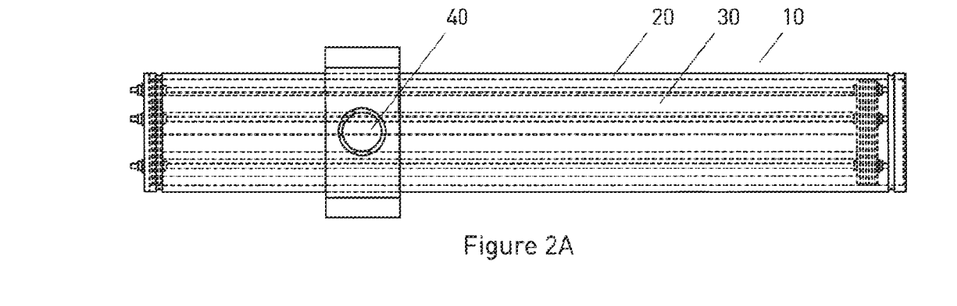
FIG. 2A is top view of the interior of the tubular membrane of FIGS. 1A to 1D.
Figures 2B, 2C:
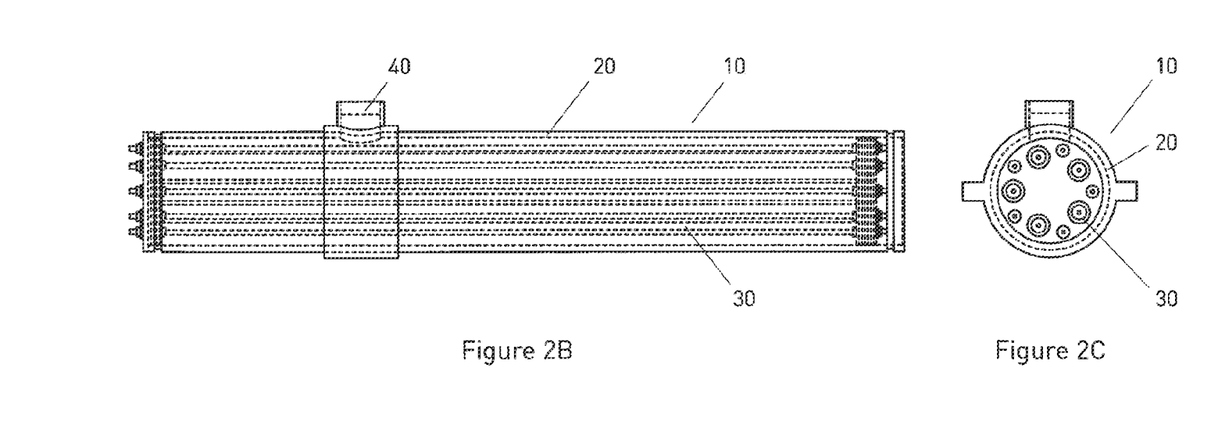
FIG. 2B is a side view thereof.
FIG. 2C is a cross sectional view of an alternative embodiment of the interior of a tubular membrane.

The above-described embodiments have been provided as examples, for clarity in understanding the invention. In particular, the representation of tubular membrane in FIGS. 1 and 2 is representative, as the system and method according to the invention can be used with any tubular membrane and is not constrained to work with only a particular type of membrane.

Given the high flux and power efficiency provided by the membrane tubes according to the invention, fewer membranes are needed and they can be used with a smaller pump. For example, in oil/water separation applications, the membrane tubes according to the invention reduce the effects of oil on the membrane by keeping the oil off the inner surface of the membrane, which extends the membranes tube's effective life.

Other applications for the system according to the invention include waste water treatment, bilge water, pharmaceutical and frack water treatment and desalination. The system according to the invention provides a more efficient separation process and higher filtration efficiencies for such applications.

The filter according to the invention may be operated manually or electronically. A person with skill in the art will recognize that alterations, modifications and variations may be effected to the embodiments described above while remaining within the scope of the invention as defined by claims appended hereto.

We claim:

1. A tubular membrane, comprising:
at least one straight membrane tube comprising a permeable inner surface; and
a vortex generator configured to cause an input fluid within the membrane tube to flow in a spiral direction thereby separating the input fluid into a first fluid portion and second fluid portion,
the vortex generator comprising a plug positioned at the end of the membrane tube, the plug including a base defining a channel to allow the input fluid to flow therethrough,
the plug shaped to bias the input fluid in the membrane tube in the spiral direction to separate the first fluid portion and the second fluid portion such that the first fluid portion has a first fluid density greater than a second fluid density of the second fluid portion,
the fluid first portion being biased to the permeable inner surface, and
the first fluid portion being filtered through the permeable inner surface.

2. The tubular membrane of claim 1 wherein the plug is positioned at a fluid entrance to the membrane tube.

3. The tubular membrane of claim 1 wherein the plug comprises a curved member extending extends into the membrane tube from the plug.

4. The tubular membrane of claim 1 wherein the second portion of the fluid is biased to an axis along the center of the membrane tube.

5. The tubular membrane of claim 1 wherein the first portion of the fluid comprises water and the second portion of the fluid comprises oil.

6. The tubular membrane of claim 2, further comprising a second plug at a fluid exit from the membrane tube, the second plug configured to further spiral the fluid.

7. The tubular membrane of claim 1 wherein the first portion of the fluid comprises water and the second portion of the fluid comprises aerated solid waste.

8. The tubular membrane of claim 1 wherein the membrane tube is a ceramic membrane tube.

9. The tubular membrane of claim 1 wherein the plug is positioned in a spacer at an end of the membrane tube.

10. The tubular membrane of claim 1 wherein the first portion of the fluid comprises water and the second portion of the fluid comprises a buoyant polymer.

11. The tubular membrane of claim 1 wherein the vortex generator comprises a twisted blade.

* * * * *